United States Patent [19]

Silver

[11] 4,280,152
[45] Jul. 21, 1981

[54] PLAYER REMOTE CONTROL HAVING SINGLE WIRE CONTROL

[75] Inventor: Bruce R. Silver, Cambridge, Mass.

[73] Assignee: Polaroid Corporation, Cambridge, Mass.

[21] Appl. No.: 29,680

[22] Filed: Apr. 13, 1979

[51] Int. Cl.³ .............................................. G11B 15/12
[52] U.S. Cl. ...................................... 360/61; 360/79; 360/137
[58] Field of Search ............... 360/79, 80, 137, 61–62; 179/100.10 R

[56] References Cited

U.S. PATENT DOCUMENTS 3,418,432  12/1968  Boggs, Jr. .................... 179/100.10 R
3,984,644  10/1976  Matz .......................... 179/100.10 R Primary Examiner—John H. Wolff
Attorney, Agent, or Firm—Edward S. Roman

[57] ABSTRACT

A remote control apparatus is provided for a record/playback device to provide control signals to actuate the device for recording, for playing back or retrieving, and for reversing or rewinding operations. The control signals are derived from separate switches and transmitted along a single signal conductor. A logic circuit responds to the signals on the single conductor to activate different output lines selectively for the different operations. The record/playback device typically is of the type that records and plays back audio information, or that records and projects visual information.

5 Claims, 1 Drawing Figure

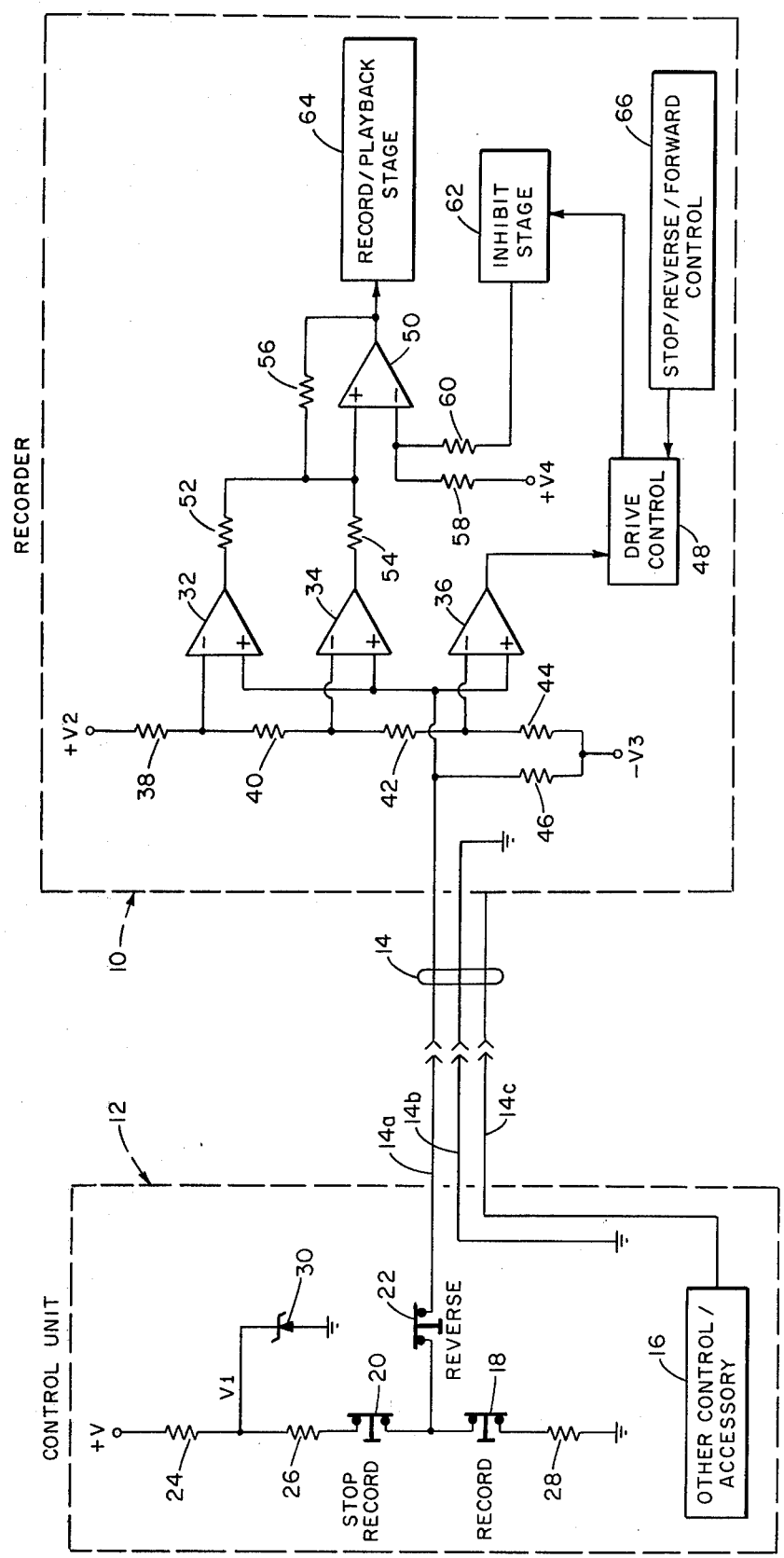

PLAYER REMOTE CONTROL HAVING SINGLE WIRE CONTROL

BACKGROUND OF THE INVENTION

This invention relates to electrical equipment for controlling a record/playback device to operate in one of at least three different modes in response to control signals delivered along a single conductor. The invention is particularly useful in controlling a record/playback device that provides a playback or retrieval operation, a record operation, and a reverse or rewind operation in response to signals produced with separate switches and communicated on a single signal conductor. A recording device of this character is also referred to herein simply as a "recorder," and the invention is described with particular reference to such a recorder. Features of the invention, however, may be used to advantage in controlling other electrical devices.

Audio records are commonly available which use magnetic recording tape and which can play back recorded information and record new information. Also, recorders can repeat playback by briefly rewinding the recording tape and automatically resuming playback. Alternatively, the "backing up" along the recording tape that the rewind operation produces can be followed by a record operation, to record new information at the tape section just rewound past the recording head. Recorders of this kind are conventionally controlled with any of numerous schemes, including the typical use of separately-wired independent switches for each operating function.

For remote cable control of a recorder in response, for example, to switches on a hand-held control box, it is often desirable to minimize the number of cable conductors. A small cable can be stored compactly and is flexible and hence easy to deploy. A cable feeding into a recorder typically has a separate conductor for each remote microphone, of which there are at least two for stereophonic recording. Additional separate conductors for each control function can result in the cable being undesirably bulky, heavy and stiff.

Similar problems can arise with a visual recorder such as a combined camera and projector. Here the separate operating functions typically include record, project and rewind. Again, remote control via a cable having few conductors may be desirable.

Accordingly, it is an object of this invention to provide electrical equipment for providing remote cable control of multiple functions of a record/playback device with a single signal conductor.

A more particular object is to provide electrical equipment for the remote cable control of record, playback and rewind operations, as signalled from separate control switches, on a single signal conductor.

It is a further object that the foregoing electrical equipment normally assume a condition that protects the recording medium from inadvertent recording or erasure.

Other objects are that the equipment operate with high reliability and be low in cost.

These and other objects of the invention are in part described more fully below and in part will be obvious to those skilled in the art from the following description.

SUMMARY OF THE INVENTION

A control apparatus is provided for a record and playback apparatus of the type having means for recording information on a recording medium and for thereafter retrieving (playing back) such recorded information from the recording medium. The record and playback apparatus further includes means for advancing, stopping or reversing the movement of the recording medium past the recording and playback means.

The control apparatus includes means responsive to the manual actuation thereof for providing at least four different control signals along a single conductor. The control means comprises at least three switch elements electrically interconnected with respect to each other so as to enable the control to provide the four different control signals upon the manual actuation of the three switch elements in a select manner.

A logic circuit responds to the first of the four different control signals to provide a record signal to actuate the recording and retrieving means to record. The logic circuit also responds to a second of the four different control signals to provide a stop record signal to activate the means for recording and retrieving to stop recording. The logic circuit further responds to a third of the four different control signals to provide a reverse or rewind signal to actuate the means for advancing, stopping and reversing the recording medium to drive the recording medium in the reverse direction past the means for recording and retieving information. The logic circuit in addition responds to a fourth of the four different control signals occurring immediately subsequent to the third control signal to provide an advance signal to actuate the means for advancing, stopping and reversing the recording medium to drive the recording medium in the advance direction past the means for recording and retrieving. In the fourth control signal, there is also provided a retrieval signal to actuate the recording and retrieving means to retrieve the information recorded on the recording medium.

Preferably, the three switches are remotely located with respect to the record and playback apparatus and a single signal conductor and ground wire are provided to connect the three switches to the record and playback apparatus.

BRIEF DESCRIPTION OF DRAWINGS

For a fuller understanding of the nature and objects of the invention, reference should be had to the following detailed description taken in connection with the accompanying drawing, which is a schematic representation, partly in block form, of recorder equipment embodying features of the invention.

DESCRIPTION OF ILLUSTRATED EMBODIMENT

With reference to the drawing, an audio recording system provides remote control of record, playback or retrieval and reverse or rewind operations of an audio recorder 10 from a remote control unit 12 by way of a cable 14. The cable 14 has a control signal conductor 14a and a ground or common return conductor 14b. A further conductor set 14c, which can include one or several conductors, interconnects other equipment 16 with the recorder 10. This equipment can, as one example, be a source of audio signals such as one or more microphones each connected to the recorder 10 by a separate conductor or pair of conductors 14c. The conductor set 14c also can include a line which supplies operating power to the control unit 12.

The control unit 12 controls operations of the recorder 10 with three single-pole single-throw switches: a record switch 18, a stop record switch 20, and a reverse or rewind switch 22. Each switch is illustrated as a normally-closed push-button switch which is in the active, open position only so long as it is depressed, and thereafter resumes the normally-closed conductive position shown. The terminals of switches 18 and 20 are in series between resistor 26 and a resistor 28 that is connected to the common return conductor. A supply voltage (+V) is applied through resistor 24 to resistor 26, and a Zener diode 30 maintains the interconnection of resistors 24 and 26 at preferably 6 volts (V1). The terminals of the remaining switch 22 are in series between the interconnection of switches 18 and 20 and the cable conductor 14a leading to the recorder 10. Thus, all the switches have one terminal in common electrical connection with respect to each other.

With further reference to the drawing, in the recorder 10 the cable conductor 14a is applied directly to the positive input of each of three comparators 32, 34 and 36. A four-step voltage divider formed by resistors 38, 40, 42 and 44 is connected between two supply voltages (+V2) and (−V3), and the interconnections between the resistors are applied to the negative inputs of the comparators 32, 34 and 36, as shown. A further resistor 46 in the recorder is connected from the (−V3) supply to the cable conductor 14a. The output line from the comparator 36 is applied to an input of a drive control stage 48 of the recorder. This stage 48 controls the movement of the recording medium relative to the record/playback transducer. As is conventional, the drive control 48 advances the tape or other recording medium in response to an assertive forward signal, reverses or rewinds the medium in response to an assertive rewind or reverse signal and stops the medium in response to a stop signal, all of which may be provided by a recorder control 66 in the recorder 10. The output from the comparator 36 triggers the drive control 48 to provide a sequenced rewind and playback operation in a manner as will be more fully described in the following discussion.

The illustrated portion of the recorder 10 includes a further comparator 50. The output lines from the comparators 32 and 34 are separately resistively coupled through resistors 52 and 54, respectively, to the positive input of the comparator 50, and a further resistor 56 feeds back the comparator output signal to that same positive input. The negative input of the comparator 50 is coupled through a resistor 58 to a positive supply (+V4), and a further resistor 50 applies an inhibit signal to the comparator 50 from an inhibit stage 62. This stage applies a high-level inhibit signal to the comparator 50 during, for example, a start-up period when the recorder has not yet reached operating speed, and under other conditions, for inhibiting recording operation as discussed further below.

The output from the comparator 50 is applied to a record/playback or record/retrieval stage 64 of the recorder. As common in magnetic tape recorders, this stage controls the record/playback circuits and transducer for selectively playing back or retrieving recorded information, and conversely for erasing previously-recorded audio information and recording new audio information.

The recorder 10 also has, as is conventional, an on-off switch (not shown) that controls, among other elements, the indicated supply voltages. The recorder drive control 66 may be actuated by a switch arrangement (not shown) for initiating either advance rewind or stopage of the recording medium. Among the conventional schemes for providing this are a further switch on the control unit 12 and appropriate connection via cable 14 to the recorder, or a switch directly on the recorder. Another alternative is automatic start of advance when a cartridge which contains the recording medium is loaded into the recorder.

The operation of the illustrated circuit will be described with specific parameter values such that the three resistors in the control unit are of equal value, and such that the resistor 40 is slightly larger than resistor 38, and their sum is nearly equal to that of resistor 42 and to that of resistor 44. Further, the three resistors coupled to the positive input of the fourth comparator 50 are of essentially equal value. In particular, in one illustrative embodiment of the invention the parameters have the following specific values:

R24=R26=R28=5.1K ohm
R38=10K ohm
R40=12K ohm
R42=R44=20K ohm
R46=510K ohm
R52=R54=R56=20K ohm
R58=R60=100K ohm
V1=15 V d.c.
V=V2=V3=V4=6 V d.c.

The circuit operates as follows with these parameter values. (The stated operating voltages are not precise, but simple nominal illustrative values.) When the three switches are in the normally-closed positions shown, the control unit 12 applies a (+3) volt potential at the commonly connected terminals to the cable conductor 14a, and this signal is applied to the positive input of each comparator 32, 34 and 36. The voltage divider formed by resistors 38, 40, 42 and 44 develops (+4) volts at the negative input of comparator 32 (+2) volts at the negative input of comparator 34, and (−2) volts at the negative input of comparator 36. The comparator 36 accordingly receives a positive input signal, i.e. the (+) input is positive relative to the (−) input, and hence produces a high output level, typically of (+6) volts. This high-value output does not affect the drive control stage 48 of the recorder which is otherwise controlled to either advance, rewind or stop the recording medium as a function of control signals received from the recorder control 66.

The comparator 34 also receives a positive input condition and hence produces a high output signal. However, the comparator 32 receives a negative input condition and accordingly produces a low-level, e.g., (−6) volt, output signal.

The fourth comparator 50 receives a high-level input at the (−) input and hence normally produces a low-level output signal. It is switched to produce a high-level output signal only when the outputs from both comparators 32 and 34 are high and the high-level inhibit signal from the recorder inhibit stage 62 is absent. Accordingly, when the system is first turned on and the cable conductor is at the (+3) level, this comparator 50 develops a low-level output signal both when the inhibit is present and when it is released. Feedback through resistor 56 to the positive input latches this output level. The resultant low level output from comparator 50 drives the record/playback stage 64 to be in the playback condition.

When it is desired to briefly rewind the recording tape, for example, to repeat the playback of material just played by the recorder, the user opens the reverse switch 22 for as long as the recorder is to rewind the recording medium. While the reverse switch 22 is open, the potential on the cable conductor 14a decreases to the (−6) volt level of (V3), which is applied to the conductor at the recorder through resistor 46. The relative polarity of the inputs to the comparator 32 are the same as previously, and accordingly the comparator develops a low-level output signal. However, the polarity of the inputs to the other comparators 34 and 36 are now reversed. Accordingly, each comparator 34 and 46 produces a low-level output signal. The low-level output signal from comparator 34 has no effect on the comparator 50; it produces a low-level output and hence is in the playback condition. However, the low-level output from comparator 36 activates the drive control stage 48 to move the recording medium in the reverse, i.e., rewind direction. Upon release of the reverse switch 22 it resumes the normally-closed condition and the circuit reverts to the previously-described playback condition where the conductor 14a is at a (+3) volt level. The comparator 36 accordingly produces a high-level output signal, thereby terminating the rewind operation and thereafter actuating the drive control stage 48 to resume advancing the recording medium. Thus, opening the reverse switch 22 when the other switches are closed only switches the output from comparator 36 to the "tape rewinding" condition for the time the switch is open. In addition, it will be readily appreciated that opening the reverse switch 22 while in the record state will have the effect of also inhibiting the record function and switching the recorder to the playback condition.

Opening the record switch 18, on the other hand, in the absence of an inhibit signal, switches the logic circuit of the recorder 10 to a record condition that continues after the switch 18 again closes. The record condition ends either when the stop record switch 20 is open or when the control 66 provides a reverse direction signal to the drive control 48 which, in turn, signals the inhibit stage 62 to provide a high level output to the comparator 50. More particularly, opening the record switch 18 on the control unit 12 applies substantially the (+6) volt (V1) level to the cable conductor 14a. This potential develops a positive input at comparator 32 and at comparator 34. In response, each of these comparators produces a high-level output signal. These two output signals actuate the comparator 50 to produce a high-level output signal. Feedback through resistor 56 latches the comparator 50 in this condition after the record switch closes. In response to the resultant high-level output signal from comparator 50, the record/playback stage 64 switches to the record condition. In this condition, the stage 64 actuates other conventional elements in the recorder 10 to record whatever audio signals it receives. Note, however, that an inhibit or high-level output signal from the inhibit stage 62 which occurs when the control 66 provides a reverse drive signal will disable the comparator 50 from responding to the coincident high-level outputs from the comparators 32 and 34. Thus, the comparator 50 only applies a high-level record signal to the stage 64 when both comparators 32 and 34 produce high-level output signals and the inhibit stage 62 does not provide the inhibit signal to the comparator 50, i.e., the high-level inhibit signal is absent.

The comparator 36 responds to the opening of the record switch 18 by again producing a high-level output signal. Hence the drive control stage 48 is unaffected and continues enabling the recorder to advance the tape or other recording medium when the system is switched to the record condition.

The operator may terminate the record operation by momentarily opening the stop record switch 20. The open switch 20 allows the potential on the cable conductor 14a to go substantially to ground level. In response to this signal, the comparator 32 produces a low-level output signal, and the comparator 34 also is driven to develop a low-level output signal. The coincidence of the two low-level outputs from comparators 32 and 34 drive the comparator 50 to produce a low-level output, and thereby terminates the high-level record signal previously applied to the stage 64. Hence the stage 64 returns to the playback state. Feedback through the resistor 56 maintains the comparator 50 in this condition. The ground level input at the positive terminal of comparator 36 ensures that that comparator produces a high-level output signal, which in turn enables the drive control 48 to respond to control signals from the control 66 in the ordinary manner.

In the event any two, or all three, of the control unit switches are opened together, i.e., concurrently, the cable conductor 14a will be at the (−V3) voltage. As described, this only causes rewinding of the recording medium, as if the reverse switch 22 were opened.

The illustrated circuit arrangement and parameter values thus develop a signal on the cable conductor 14a which has four different analog values, depending on the condition of the switches 18, 20 and 22. The relation of these four signal values to the input conditions to the comparator elements 32, 34 and 36 is such that each signal value produces a different combination of comparator operating states.

In summary, the logic of the illustrated control unit and recorder circuit enables the recorder to normally remain in the playback or retrieval mode except when switched such as to the record condition by opening the record switch 18. The system then ordinarily remains in the record condition until the stop record switch 20 is opened momentarily. Further, the record condition is switched back to the playback condition automatically in response to the inhibit stage 62 applying an inhibit signal to the comparator 50 as would occur if the control 66 provided a reverse command signal. The comparator 36 develops a reverse initiating output signal when the reverse switch 22 is opened, which switches the comparator 36 to activate the drive control stage for reverse movement. As will be readily understood, the simultaneous opening of any two switches will provide the same effect as opening the reverse switch 22. The reverse operation automatically terminates upon closure of the reverse switch 22.

Alternatively, the aforementioned arrangement may be utilized for controlling a visual record (exposure) and project device, whether photographic or video. When all switches of the control unit 12 are in the normally-closed condition, the logic in the illustrated recorder circuit 10 will enable such a visual device to remain in a playback or projection condition. Opening the reverse switch 22 will terminate a record condition if present and initiate a rewind operation. Opening the record switch 18 in the control unit 12 will in the absence of an inhibit signal switch the operation to visual recording (exposure) while not effecting the direction of motion still in advance, rather than rewind. Opening the stop record switch 20 will terminate the record operation and return the instrument to the normal drive condition as determined by the control 66.

It will thus be seen that the control unit and recorder circuit described enable a recorder, whether of audio information or of visual information, to be operated from three separate control switches with signals communicated on a single control cable. There is also a return conductor, typically a ground path. The various signals which the control switches produce have significantly different levels and the use of four comparators in the recorder logic stage provides reliable and positive switching operation. The four comparators can be provided commercially on a single integrated circuit chip as a quad-comparator unit.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not interpreted in a limiting sense.

It is also to be understood that the following claims are intended to cover all of the generic and specific features of the invention herein described, and all statement of the scope of the invention which, as a matter of language, might be said to fall therebetween.

What is claimed is:

1. A control apparatus for a record and playback apparatus of the type having means for recording information on a recording medium and for thereafter retrieving such recorded information from the recording medium, and means for either advancing, stopping or reversing the movement of the recording medium past the recording and playback means; said control apparatus comprising:

control means responsive to the manual actuation thereof for providing at least four different control signals along a single conductor, said control means comprising three switch elements electrically interconnected with respect to each other so as to enable said control means to provide said four different control signals upon the manual actuation of said three switch elements in a manner wherein one of said four control signals occurs when all of said switch elements are in a closed conductive state and wherein each of the other three of said four control signals occurs respectively upon the opening of one of the switch elements with the other switch elements remaining in the closed conductive state; and logic means responsive to a first of said four different control signals from said control means for providing a record signal to actuate the recording and retrieving means to record, responsive to a second of said four different control signals from said control means for providing a stop record signal to actuate the recording and retrieving means to stop recording, responsive to a third of said four different control signals from said control means for providing a reverse signal to actuate the advancing, stopping and reversing means to drive the recording medium in the reverse direction past the recording and retrieving means, and responsive to a fourth of said four different control signals occurring immediately subsequent to said third control signal for providing an advance signal to actuate the advancing, stopping and reversing means to drive the recording medium in the advance direction past the recording and retrieving means, and for providing a retrieve signal to actuate the recording and retrieving means to retrieve information recorded on the recording means.

2. The control apparatus of claim 1 wherein said three switches are remotely located with respect to the record and playback apparatus and wherein there is further included a single signal conductor as well as a ground return conductor for connecting said three switches to the record and playback apparatus.

3. The apparatus of claim 1 wherein said three switch elements comprise single-pole, single-throw switches all having one terminal in common connection with respect to each other.

4. The apparatus of claim 1 wherein said control means further includes means for providing a different voltage level by way of a respective resistor to each of the noncommonly connected terminals of said switch elements such that said control signal equals the voltage at the commonly connected terminals when all of said switches are in a closed conductive state and wherein: the opening only of the first said switch elements operates to change said control signal to substantially the voltage level at the noncommonly connected terminal of the second of said switch elements, the opening only of the second of said switch elements operates to change said control signal to substantially the voltage level at the noncommonly connected terminal of the first of said switch elements and the opening only of the third of said switch elements operates to change said control signal to substantially the voltage level at the noncommonly connected terminal of the third of said switch elements thereby providing said four different control signals.

5. The apparatus of claim 1 wherein said logic means comprises at least three comparator circuits in parallel connection with respect to each other and a fourth comparator circuit in serial connection with respect to two of said three comparator circuits so as to receive the output signals therefrom, the output of said fourth comparator circuit being connected to actuate the recording and retrieving means and the output of said third nonserially connected comparator being connected to actuate the advancing, stopping and reversing means of the record and playback apparatus.

* * * * *